United States Patent
Gorman et al.

(10) Patent No.: US 7,039,990 B2
(45) Date of Patent: May 9, 2006

(54) ZONED STRETCHING OF A WEB

(75) Inventors: Michael R. Gorman, Lake Elmo, MN (US); Rodney K. Hehenberger, Apple Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/064,465

(22) Filed: Feb. 23, 2005

(65) Prior Publication Data
US 2005/0147802 A1   Jul. 7, 2005

Related U.S. Application Data

(62) Division of application No. 10/318,570, filed on Dec. 13, 2002, now Pat. No. 6,938,309.

(51) Int. Cl.
*D06C 3/00* (2006.01)

(52) U.S. Cl. ............... 26/51; 26/87; 26/71; 28/155

(58) Field of Classification Search ............ 26/51, 26/51.3, 53, 71, 72, 76–78, 87, 88, 89–93, 26/96, 97, 52, 105, 98, 99–102; 28/102, 28/165, 155–157; 425/66, 363, 364 R, 370–373, 425/366; 264/209.5, 282, 210.7, 290.2, 288.4, 264/288.8, 291; 156/160, 163, 164, 229, 156/494, 495, 496

See application file for complete search history.

(56) References Cited

U.S. PATENT DOCUMENTS

| | | | |
|---|---|---|---|
| 1,732,089 A | 10/1929 | Honeyman, Jr. et al. | |
| 1,732,968 A | 10/1929 | Dwight | |
| 2,034,421 A | 3/1936 | Rowe et al. | |
| 2,096,087 A | 10/1937 | Collidge | |
| 2,158,087 A | 5/1939 | Rowe et al. | |
| 2,434,111 A | 1/1948 | Hawley, Jr. et al. | |
| 2,483,339 A | 9/1949 | Gardner et al. | |
| 2,618,012 A | 11/1952 | Milne | |
| 2,745,538 A | 5/1956 | Lamb | |
| 2,841,820 A | 7/1958 | Pfeiffer | |
| 2,856,060 A | 10/1958 | Malnati | |
| 2,938,568 A | 5/1960 | Cock | |
| 2,945,283 A * | 7/1960 | Harmon et al. | 28/103 |
| 3,203,386 A | 8/1965 | Briggs | |
| 3,220,056 A | 11/1965 | Walton | |
| 3,233,029 A | 2/1966 | Rasmussen | |
| 3,261,903 A | 7/1966 | Carr | |
| 3,296,351 A | 1/1967 | Rasmussen | |

(Continued)

FOREIGN PATENT DOCUMENTS

DE    25 03 775 A1    8/1976

(Continued)

*Primary Examiner*—A. Vanatta
(74) *Attorney, Agent, or Firm*—William J. Bond

(57) ABSTRACT

Apparatus and methods for stretching one or more zones of a web are disclosed. Webs including stretched or activated zones are also disclosed. Each of the zones in the web is stretched in the cross-web direction, i.e., the direction transverse to the down-web direction. The stretching it can be performed continuously as the web is advancing through the apparatus in the down-web direction. The stretching can occur in the absence of physical contact with the stretched zone of the web. Strain induced on the stretched zones can be introduced gradually over a stretch distance. The strain may increase at a linear rate. The stretching methods and apparatus may be used to activate an elastic zone or zones within a web.

39 Claims, 3 Drawing Sheets

U.S. PATENT DOCUMENTS

| | | |
|---|---|---|
| 3,303,547 A | 2/1967 | Kalwaites |
| 3,466,358 A | 9/1969 | Muller |
| 3,501,565 A | 3/1970 | Kalwaites et al. |
| 3,528,145 A | 9/1970 | Troope |
| 3,624,874 A | 12/1971 | Lauchenauer |
| 3,708,831 A | 1/1973 | Burger |
| 3,808,639 A | 5/1974 | Tautvaisas |
| 3,849,526 A | 11/1974 | Muller et al. |
| 3,962,760 A | 6/1976 | Koss et al. |
| 4,087,226 A | 5/1978 | Mercer |
| 4,116,892 A | 9/1978 | Schwarz |
| 4,144,008 A | 3/1979 | Schwarz |
| 4,153,664 A | 5/1979 | Sabee |
| 4,209,563 A | 6/1980 | Sisson |
| 4,223,059 A | 9/1980 | Schwarz |
| 4,223,063 A | 9/1980 | Sabee |
| 4,251,585 A | 2/1981 | Schwarz |
| 4,324,752 A | 4/1982 | Newton et al. |
| 4,336,638 A | 6/1982 | Mercer |
| 4,368,565 A | 1/1983 | Schwarz |
| 4,374,690 A | 2/1983 | Canterino et al. |
| 4,464,815 A | 8/1984 | Canterino et al. |
| 4,475,971 A | 10/1984 | Canterino |
| 4,517,714 A | 5/1985 | Sneed et al. |
| 4,618,384 A | 10/1986 | Sabee |
| 4,786,448 A * | 11/1988 | Fukuhara et al. ............ 264/85 |
| 4,834,741 A | 5/1989 | Sabee |
| 4,968,313 A | 11/1990 | Sabee |
| 4,994,335 A * | 2/1991 | Kamaei et al. ............ 429/254 |
| 5,014,402 A | 5/1991 | Cunningham |
| 5,072,493 A * | 12/1991 | Hommes et al. ............ 26/72 |
| 5,134,174 A * | 7/1992 | Xu et al. .................... 521/143 |
| 5,143,679 A | 9/1992 | Weber et al. |
| 5,156,793 A | 10/1992 | Buell et al. |
| 5,167,897 A | 12/1992 | Weber et al. |
| 5,196,247 A | 3/1993 | Wu et al. |
| 5,422,172 A | 6/1995 | Wu |
| 5,514,470 A | 5/1996 | Haffner et al. |
| 5,517,737 A | 5/1996 | Viltro et al. |
| 5,547,531 A | 8/1996 | Allen et al. |
| 5,560,793 A | 10/1996 | Ruscher et al. |
| 5,729,878 A * | 3/1998 | Kurihara et al. ............ 26/101 |
| 5,804,021 A | 9/1998 | Abuto et al. |
| 5,861,074 A | 1/1999 | Wu |
| 6,051,177 A * | 4/2000 | Ward ...................... 264/288.8 |
| 6,159,584 A | 12/2000 | Eaton et al. |
| 6,658,708 B1 | 12/2003 | Fukuzawa et al. |
| 6,770,356 B1 * | 8/2004 | O'Donnell et al. ...... 428/297.4 |
| 6,785,937 B1 * | 9/2004 | Morman et al. ............ 26/71 |
| 6,802,110 B1 | 10/2004 | Berweger et al. |
| 2002/0190406 A1 * | 12/2002 | Merrill et al. ............ 264/1.7 |

FOREIGN PATENT DOCUMENTS

| | | |
|---|---|---|
| EP | 0 338 747 A1 | 10/1989 |
| EP | 0 573 586 B1 | 12/1993 |
| EP | 0 396 800 B1 | 8/1995 |
| SU | 711208 A | 1/1980 |
| WO | WO 92/15444 | 9/1992 |
| WO | WO 99/56685 A1 | 11/1999 |

* cited by examiner

ZONED STRETCHING OF A WEB

This application is a divisional of U.S. patent application Ser. No. 10/318,570, filed Dec. 13, 2002, now U.S. Pat. No. 6,938,309.

FIELD OF THE INVENTION

The present invention relates to the field of webs, web processing methods, and web processing apparatus. More particularly, the present invention provides apparatus and methods for stretching one or more zones of a web in the cross-web direction and webs so stretched.

BACKGROUND

It may be desirable in many instances to stretch a web in the cross-web direction during processing. For example, webs including layers of inelastic materials, e.g., nonwoven webs, laminated or otherwise attached to elastic layers typically require stretching to impart elasticity to the web. Stretching the web such that inelastic layers or bonds within the inelastic layer or layers are broken or otherwise disrupted leaves the stretched web elastic due to the one or more layers of elastic materials located within the web. Such stretching to impart elasticity to a web is commonly referred to as "activation" of the web (with the elasticity of the web being "activated" by the stretching). Activation can be performed by a variety of methods including, for example, tentering and ring rolling.

Tentering typically involves grasping the edges of a web and stretching the web in the cross-web direction while advancing the web in the down-web direction (i.e., along the length of the web). Although tentering does provide the ability to vary the amount of strain induced in the web, it also suffers from a number of disadvantages. For example, the edges of the web must often be discarded after tentering due to damage or inconsistent strain in the web at the edges. Another potential disadvantage is that it may be difficult or impossible to induce strain into selected portions or zones of a web using tentering. Further, tentering equipment can be both costly, complex, and may require significant amounts of floorspace to operate.

Ring rolling does offer an alternative to tentering for stretching a web. Various ring rolling apparatus are described in, e.g., U.S. Pat. No. 5,143,679 (Weber et al.); U.S. Pat. No. 5,156,793 (Buell et al.); and U.S. Pat. No. 5,167,897 (Weber). Although ring rolling can be used to stretch selected zones in a web, disadvantages of ring rolling may include, for example, contact of the web by the ring rolling apparatus that may undesirably affect the web's appearance. The amount of strain that can be induced in a web using ring rolling may be limited by the ring rolling equipment. Adjustment or change in the stretch amounts may be difficult or limited. Further, the ring rolling equipment typically must be stopped to effect changes in the amount of stretch. In addition, ring rolling typically involves the rapid application of non-linear strain to the web, such that the web may tear or rupture, thereby resulting in excessive waste.

SUMMARY OF THE INVENTION

The present invention provides apparatus and methods for stretching one or more zones of a web and webs including one or more stretched zones. Each of the stretched zones in the web is stretched in the cross-web direction, i.e., the direction transverse to the down-web direction. The stretching can be performed continuously as the web is advancing through the apparatus in the down-web direction.

Among the potential advantages of the methods and apparatus of the present invention is that the stretching can occur in the absence of physical contact with the stretched zone of the web. That lack of physical contact may prevent marking of the web during stretching. Furthermore, contact with the stretched portion of a web during stretching may result in rupture or tearing of the web if, e.g., the web is particularly fragile while stretched.

Another potential advantage of the apparatus and methods of the present invention is that strain induced on the stretched zones can be introduced gradually over a stretch distance such that rapid stretching that could result in tearing or rupture of the web can be avoided. In one approach, the methods and apparatus of the present invention can provide strain that increases at a linear rate as opposed to the non-linear induction of strain in, e.g., ring rolling. The linear nature of the strain may help to reduce potential problems with rupture or tearing of the web due to sudden application of strain.

In another approach, the present invention may be characterized in terms of strain rate, that is, the rate at which, e.g., strain of 1 (i.e., stretching by 100%) is induced may be limited to, e.g., 100/minute or less at a line speed of 20 meters per minute, more preferably 50/minute or less when line speed is 20 meters/minute. Strain rate in methods of the present invention may increase at a rate linearly proportional to the line speed. As a result, when a zone or zones in a web are to be stretched by 100%, strain rate using the methods and apparatus of the invention may be limited to 500/minute or less when the line speed is 100 meters/minute, more preferably 250/minute or less when line speed is 100 meters/minute.

Another manner in which the methods and apparatus of the present invention may be characterized is by stretch distance. For example, the present invention may provide a stretch distance of 0.2 meters or more, preferably 0.4 meters or more, and even 0.5 meters or more. Within that stretch distance, only a portion of the web is activated or stretched (in contrast to, e.g., tentering processes and equipment in which a web is stretched across substantially its entire width).

Another potential advantage of the apparatus and methods of the present invention is that the amount of strain and/or the strain rate may be easily adjusted, even while the web is being processed. That ability to adjust strain and/or strain rate while the web is moving in the down-web direction may be especially useful if, e.g., coupled with a feedback control system that monitors the strain, strain rate or other characteristics to maintain desired strain levels in the stretched webs. It may also be useful in starting up the process because the web may be threaded through the apparatus with no stretch being induced, followed by increasing the stretch amount as the web moves in the down-web direction.

Another potential advantage may be found in the ability to stretch all of a web within a stretched zone that is considerably wider than is possible with, for example, ring rolling methods and equipment. In one aspect, it may be possible to stretch all of the web within a zone that has a width of 5 millimeters or more before stretching. In another aspect, the zones of the web surrounding the stretched zone may be as wide or wider than the stretched zone (which, itself, may be 5 millimeters or more in width before stretching as noted above).

The stretching apparatus and methods of the present invention can be used to "activate" zones in a web such that the activated zones exhibit elasticity after activation. As discussed above, stretching a web such that inelastic layers or bonds within the inelastic layer or layers are broken or otherwise disrupted, thereby leaving the stretched portion of the web elastic due to, e.g., elastic materials located within the web. As used herein, an inelastic zone in a web is "activated" if it has been stretched such that, after stretching, the stretched zone of the web exhibits elastic behavior. By elastic behavior, it is meant that, after stretching of an activated zone, the activated zone substantially returns to its relaxed dimension in the absence of any constraining forces.

In one aspect, the present invention provides a method of stretching a web by advancing a web in a down-web direction, the web having a width in a cross-web direction transverse to the down-web direction. The web includes first, second, and third zones, each of the first, second, and third zones including a portion of the width of the web and extending along a length of the web in the down-web direction, wherein the second zone is located between the first and third zones. The method further includes stretching the web within the second zone in the cross-web direction over a stretch distance while advancing the web in the down-web direction, wherein the stretching involves changing positions of the first zone and the third zone relative to each other in a stretch direction perpendicular to both the down-web and the cross-web directions. In the method, all of the web within the second zone is stretched and the second zone has a width of 5 millimeters or more before the stretching.

In another aspect, the present invention provides a method of stretching a web by advancing a web in a down-web direction, the web having a width in a cross-web direction transverse to the down-web direction. The web includes first, second, and third zones, each of the first, second, and third zones including a portion of the width of the web and extending along a length of the web in the down-web direction, wherein the second zone is located between the first and third zones. The method further includes stretching the web within the second zone in the cross-web direction over a stretch distance while advancing the web in the down-web direction, wherein the stretching involves changing positions of the first zone and the third zone relative to each other in a stretch direction perpendicular to both the down-web and the cross-web directions. The stretching of the web within the second zone by 100% induces a strain rate of 100 per minute or less while advancing the web in the down-web direction at a line speed of 20 meters per minute, wherein the strain rate increases at a rate linearly proportional to the line speed.

In another aspect, the present invention provides a method of method of stretching a web by advancing a web in a down-web direction, the web having a width in a cross-web direction transverse to the down-web direction. The web includes first, second, and third zones, each of the first, second, and third zones including a portion of the width of the web and extending along a length of the web in the down-web direction, wherein the second zone is located between the first and third zones. The method further includes stretching the web within the second zone in the cross-web direction over a stretch distance while advancing the web in the down-web direction, wherein the stretching involves changing positions of the first zone and the third zone relative to each other in a stretch direction perpendicular to both the down-web and the cross-web directions. Changing the position of the first zone relative to the third zone comprises linearly increasing a difference in the position of the first zone relative to the third zone in the stretch direction over the stretch distance.

In another aspect, the present invention provides an apparatus for stretching a web. The apparatus includes a web path having a down-web direction extending from an input end to an output end and a cross-web direction transverse to the down-web direction, wherein the web path defines first, second, and third zones, each of the first, second, and third zones including a portion of the width of the web path and extending along a length of the web path in the down-web direction, wherein the second zone is located between the first and third zones. The first zone and the third zone may be in neutral positions relative to each other in which the first, second, and third zones are aligned in the cross-web direction. The first zone and the third zone may alternatively be in stretch positions relative to each other in which the first zone and the third zone are displaced from each other in a stretch direction that is perpendicular to both the down-web and the cross-web directions. The web path further defines a stretch distance over which the first zone and third zone are displaced relative to each other in the stretch direction when in the stretch positions. The second zone of the web path spans between the first zone and the third zone and is unsupported therebetween over the stretch distance.

In another aspect, the present invention provides a web having an indefinite length and a width in a cross-web direction transverse to the length, wherein the web further includes first, second, and third zones, each of the first, second, and third zones comprising a portion of the width of the web and extending along a length of the web. The second zone is located between the first and third zones. The second zone is an elastic activated zone with a width of 5 millimeters or more when in a relaxed state. The first zone has a width that is greater than or equal to the width of the second zone when in a relaxed state.

In another aspect, the present invention provides a web having an indefinite length and a width in a cross-web direction transverse to the length, wherein the web further includes first, second, and third zones, each of the first, second, and third zones comprising a portion of the width of the web and extending along a length of the web. The second zone is located between the first and third zones. The second zone is a stretched zone with a width of 5 millimeters or more after stretching from an original width. The first zone has a width that is greater than or equal to the width of the second zone.

These and other features and advantages of the apparatus and methods of the present invention will be described below with respect to illustrative embodiments of the invention.

DETAILED DESCRIPTION OF ILLUSTRATIVE EMBODIMENTS OF THE INVENTION

Figure 1:
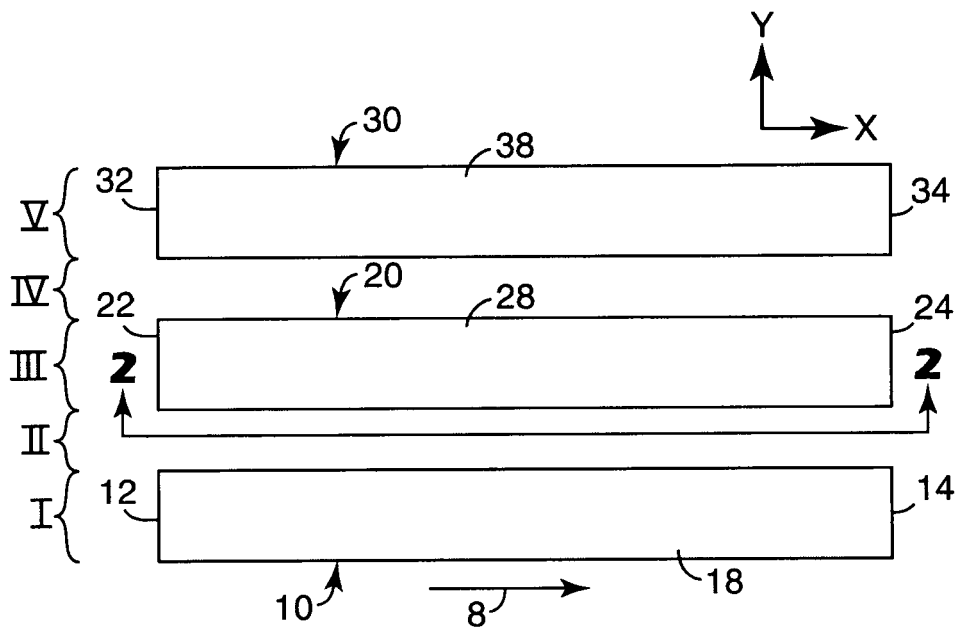
FIG. 1 is a plan view of one apparatus according to the present invention.

FIG. 1 is a plan view of one embodiment of a zone stretching apparatus according to the present invention. The apparatus includes a series of belts 10, 20, and 30 that define a web path having a down-web direction represented by arrow 8. The web path may include sides that are defined by the outermost belts 10 and 30 on the edges of the web path, although a web traveling along the web path may actually be wider than the web path as defined by the outermost belts 10 and 30. In addition to defining a down-web direction, the arrow 8 also can be used to define the cross-web direction that is transverse to the down-web direction.

In use, belt 10 rotates such that its upper surface 18 moves in the direction of arrow 8, while its lower surface (not shown) moves in the opposite direction. Belt 10 includes an input end 12 and output end 14. Similarly, belt 20 includes an input end 22 and output end 24 with an upper surface 28 that moves in the direction of arrow 8 and a lower surface (not shown) that moves in the opposite direction. Likewise, belt 30 includes input end 32 and output end 34, with an upper surface 38 that moves in the direction of arrow 8 and a lower surface (not shown) that moves in the opposite direction.

Together, input ends and output ends of the belts 10, 20 and 30 define corresponding input ends and output ends of the web path defined by the belts. Also seen in FIG. 1 are perpendicular x and y reference axes, with the x-axis being aligned in the down-web direction depicted by arrow 8 and the y-axis axis aligned with the cross-web direction (transverse to the down-web direction). Although not seen in FIG. 1, it will be understood that a third reference axis, i.e., a z-axis, can be defined as a reference axis that is perpendicular to both the x and y reference axes. The z-axis is depicted in connection with FIGS. 2–5.

The arrangement of belts 10, 20, and 30 along the web path can be characterized as defining zones within the web path, with belt 10 defining Zone I, belt 20 defining Zone III, and belt 30 defining Zone V. Although not necessarily required, it may be preferred that at least some separation or space be provided between adjacent belts. In the depicted embodiment, the space between belts 10 and 20 defines zone II in the web path and the space between belts 20 and 30 defines Zone IV within the web path. Zones II and IV will typically serve as the stretching zones within the web path, i.e., the zones in which all or substantially all of the stretching occurs during processing. Each of the zones can be described as occupying a portion of the width of the web path and preferably extend over the length of the web path, from the input end to the output end.

Typically, all of the web within Zones II and IV is stretched, with each those zones having a cross-web width of 5 millimeters or more. It may be preferred, but is not required, that Zones II and IV be stretched simultaneously. Alternatively, only one of Zones II and IV may be activated.

When comparing the present invention to conventional stretching processes such as ring rolling, one manner in which the invention may be characterized is in terms of strain rate. As used herein, strain rate is strain per unit of time with the understanding that strain is, itself, a dimensionless unit (because strain is determined as the change in length of the article divided by the original length of the article before stretching). In terms of the present invention, strain rate may be determined according to the following equation:

$$(\text{Change in Length/Original Length})/(\text{Stretch distance/Line Speed})$$

Where, for example, a zone in a web is to be stretched by 100%, that is, where the change in length is equal to the original length (thus doubling the length of the article in the stretch direction), strain rate using the methods and apparatus of the invention may be limited to 100/minute or less when the line speed is 20 meters/minute, more preferably 50/minute or less when line speed is 20 meters/minute. The methods and apparatus of the present invention can achieve such strain rates over a stretch distance of 0.2 meters or more.

Comparatively speaking, a ring rolling process using meshing corrugated rolls with an overlap of 3.3 millimeters (0.14 inches) and a peak-to-peak groove pitch of 3.8 millimeters (0.15 inches) (see, e.g., U.S. Pat. No. 5,143,679 to Weber et al.) would require rolls with a diameter of 38 meters (125 feet) to achieve the same stretch distance and, thus, a strain rate of 100/minute at a line speed of 20 meters/minute. It will be understood that rolls of that size are essentially impossible to construct and operate in a safe and/or efficient manner according to known engineering principles or with feasible economics.

While the methods and apparatus of the present invention provide significantly lower strain rates than, e.g., ring rolling, at relatively low line speeds, the reduction in strain rates becomes more pronounced as the line speed increases. For example, when a web is to be stretched by 100%, strain rate using the methods and apparatus of the invention may be limited to 500/minute or less when the line speed is 100 meters/minute, more preferably 250/minute or less when line speed is 100 meters/minute. Operating conventional ring rolling equipment with meshing corrugated rolls having a diameter of 0.2 meters (8 inches) with an overlap of 3.3 millimeters (0.13 inches) and a peak-to-peak pitch of 3.8 millimeters (0.15 inches) at the same line speed would yield a strain rate of over 1100/minute. This elevated strain rate is due primarily to the short stretch distance provided by conventional ring rolling equipment.

Strain rate increases at a rate proportional to the line speed. In connection with the present invention, strain rate may increase at a rate linearly proportional to line speed. In contrast, the strain rate of a ring rolling process increases at a rate that is not linearly proportional to line speed. As a result, faster line speeds may yield even more dramatic differences between the methods and apparatus of the present invention and ring rolling processes. For example, the present invention may provide a strain rate of 1500/minute or less when the line speed is 300 meters/minute, preferably 750/minute or less when the line speed is 300 meters/minute.

Strain rate is also inversely proportional to the stretch distance, with increases in stretch distance yielding lower strain rates. For example, the methods and apparatus of the invention that have a stretch distance of 0.2 meters or more may provide strain rates of 100/minute or less when the line speed is 20 meters/minute, 500/minute or less when the line speed is 100 meters/minute, or 1500/minute when the line speed is 300 meters/minute. In another set of examples, the methods and apparatus of the invention that have a stretch distance of 0.4 meters or more may provide strain rates of 50/minute or less when line speed is 20 meters/minute, 250/minute or less when line speed is 100 meters/minute, or 750/minute or less when line speed is 300 meters/minute.

The following table provides a range of strain rates (per minute) for 100% stretch at various distances and lines speeds that may be achieved using the present invention. It may be preferred that the relationships be linear as seen from the values in the table, although in some embodiments of the present invention linear relationships may not be provided.

| Line Speed↓ | Stretch distance→ | | | | |
| --- | --- | --- | --- | --- | --- |
| | 0.2 m | 0.4 m | 0.5 m | 0.75 m | 1.0 m |
| 1 mpm | 5 | 3 | 2 | 1.3 | 1 |
| 5 mpm | 25 | 13 | 10 | 7 | 5 |
| 20 mpm | 100 | 50 | 40 | 27 | 20 |
| 50 mpm | 250 | 125 | 100 | 67 | 50 |
| 100 mpm | 500 | 250 | 200 | 133 | 100 |
| 300 mpm | 1500 | 750 | 600 | 400 | 300 |

Another manner in which the methods and apparatus of the present invention may be characterized is by stretch distance. For example, the present invention may provide a stretch distance of any desired length, e.g., 0.2 meters or more, 0.5 meters or more, 0.75 meters or more, etc. Within that stretch distance, only a portion of the web is activated or stretched (in contrast to, e.g., tentering processes and equipment in which a web is stretched across substantially its entire width). Within the selected stretch distance range, an activation or stretch of virtually any selected amount (e.g., 100%) in only the selected zone or zones may be achieved.

In comparison, a ring rolling process providing 100% stretch using meshing corrugated rolls with an overlap of 3.3 millimeters (0.13 inches) and a peak-to-peak pitch of 3.8 millimeters (0.15 inches) would require rolls with a diameter of 38 meters (125 feet) meters/inches to achieve a stretch distance of 0.2 meters or a diameter of 114 meters (375 feet) to achieve a stretch distance of 0.4 meters. Rolls of that size are essentially impossible to construct and operate in a safe and/or efficient manner according to known engineering principles or with feasible economics.

The methods and apparatus of the present invention may alternatively be characterized by the relationships between width of the stretched zones and the zones surrounding them. In essence, it may be preferred that the unstretched zones have a width that is equal to or greater than the width of the stretched zones. This may be particularly true where the unstretched zone is located between two stretched zones (in which all of the web is stretched). For example, in a five zone web where the portion of the web within Zone II is stretched, Zone I may preferably have a width that is equal to or greater than the width of Zone II. It may also be preferred that Zone III have a width that is equal to or greater than the width of Zone II and, further, that Zone III have a width that is equal to or greater than the width of Zone IV (where Zone IV is also a stretched zone). It may further be preferred that Zone V have a width that is equal to or greater than the width of Zone IV.

Although the depicted apparatus includes five zones arranged over the width of the web path, it will be understood that the present invention may be practiced with as few as three zones. For example, belts 10 and 20 could be used without belt 30, resulting in a web path defined by Zones I, II, and III. It should also be understood that web paths may be provided that have more than five zones arranged across the width of the web path.

Figure 2:
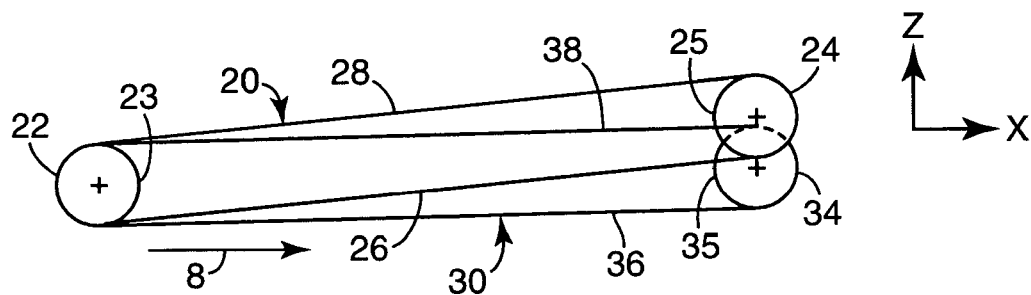
FIG. 2 is a cross-sectional view of the apparatus of FIG. 1 taken along line 2—2 in FIG. 1.

FIG. 2 is a cross-sectional view of the apparatus of FIG. 1 taken along line 2—2 in FIG. 1. Belt 20 includes a pulley 23 at its input end 22 and a pulley 25 at its output end 24 with the belt 20 stretched over pulleys 23 and 25. Belt 20 includes an upper surface 28 and a lower surface 26, with the two surfaces moving in opposite directions as the belt 20 is rotated about the pulleys 23 and 25. Although the pulleys at the input and output ends are depicted as having a similar diameter, it should be understood that the sizes of the pulleys may be different.

Because it is partially obscured by belt 20 and its pulleys 23 and 25, only a portion of belt 30 and its supporting structure is shown in FIG. 2, with the input end of belt 30 (and its associated pulley) being hidden behind the input end 22 of belt 20 and its pulley 23. The output end 34 of belt 30 is, however, seen in FIG. 2, along with pulley 35 that is located at the output end 34 of belt 30. Also seen in FIG. 2 are both the lower surface 36 and the upper surface 38 of the belt 30, with the two surfaces moving in opposite directions during operation of the apparatus.

The output end 24 of belt 20 is shown as having some displacement in the z-axis direction relative to belt 30. It is that displacement that provides for stretching of a web processed by the apparatus as will be described in more detail with respect to FIGS. 3–5 herein. Typically, it will be preferred to displace only one end of a belt at its output end, while maintaining the relative positions of all of the belts at the input end.

Because the belts 20 and 30 are displaced from each other in the z-axis, it may be desirable, in some instances to operate one belt at a faster or slower velocity to adjust for the different web path lengths of the different zones. For example, in an apparatus such as that depicted in FIGS. 1 and 2, the web path length within Zone III is different than the web path length within Zones I and V. As a result, it may be desirable to operate belt 20 at a slightly higher down-web velocity relative to belts 10 and 30 in Zones I and III. Alternatively, it may be desirable to modify the web path lengths in the different zones such that all of the zones have the same path length (or nearly the same) such that no adjustments to web velocity in the different zones are required.

Although the apparatus of the present invention are depicted as relying on the use of continuous belts wrapped around rotating pulleys, it will be understood that other alternative structures may be used in place of continuous belts. For example, a series of rollers may be used which may, preferably, have a relatively small diameter such that the rollers can be closely spaced. In other instances, it may be possible to use continuous belts in combination with rollers other structures to support and/or retain a web during processing.

Figure 3:
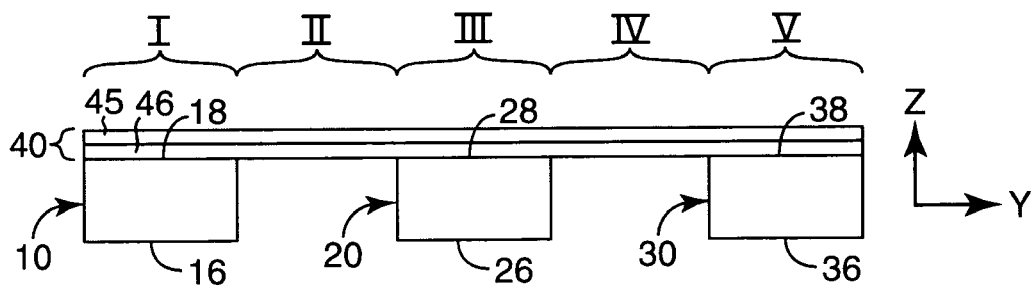
FIG. 3 is an elevational view of the output end of the apparatus of FIG. 1 with a web 40 located on the apparatus.

FIG. 3 is an end view of the apparatus of FIG. 1, with a web 40 located along the web path, the web 40 being in contact with the upper surfaces 18, 28, and 38 of the belts 10, 20, and 30, respectively. Also depicted in FIG. 3 are Zones I, II, III, IV, and V, along with both the y and z reference axes.

The view as seen in FIG. 3 is taken before any displacement of one or more belts is provided in the z-axis direction. In this arrangement, the belts and their respective zones can be described as being in neutral positions relative to each other, i.e., no cross-web stretch is being induced in the web 40.

The web 40 may be any web for which stretching in the cross-web direction is desired (with the cross-web direction corresponding to the y-axis as seen in FIG. 3). The depicted web 40 is a laminate including a first layer 45 and a second layer 46. The first and second layers 45 and 46 may be the same or different. It may be preferred that the second layer 46 include elastic material (e.g., a sheet, filaments, strands, etc.) such that the layer 46 can impart elasticity to the web 40. It may be preferred that the first layer 45 be inelastic (e.g., a nonwoven material). One preferred web 40 may include an inelastic layer 45 laminated to an elastic layer 46 such that, before stretching, the web 40 is, as a whole, substantially inelastic.

As a result of stretching, the web 40 may become elastic within the stretched zone or zones as the bonds within the inelastic layer are fractured or otherwise disrupted, thereby allowing the elastic nature of layer 46 to dominate within the stretched zones. As discussed herein, the stretched zones may be described as activated zones to denote that the latent elasticity of the zones has been activated.

Although the web 40 is depicted as a multilayer structure, it will be understood that the web 40 may include any number of layers, structures, materials, etc. as desired. Furthermore, portions of the web 40 may be purely inelastic, i.e., portions of the web 40 may not include any significant amount of elastic materials. For example, it may be preferred that the web 40 include inelastic web components in the areas of Zones I, III, and V and nonwoven/elastic web laminates in the areas of Zones II and IV. Another example of a multi-component web is described below in connection with FIG. 10.

Figure 4:
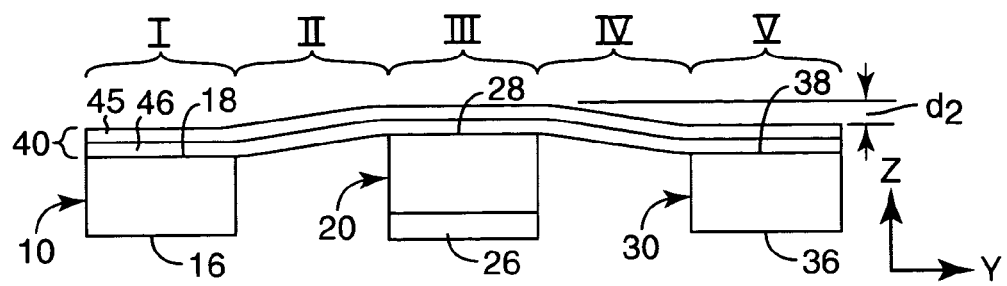
FIG. 4 is an elevational view of the output end of the apparatus of FIG. 1, with a web 40 located thereon and with the belt 20 occupying Zone III displaced from belts 10 and 30 in the z-axis direction.

FIG. 4 is an end view of the apparatus as seen in FIG. 3 with, however, displacement of belt 20 in the z-axis direction over a distance $d_z$ (see FIG. 2 for a side elevational view of the displacement). The lower surface 26 of the belt 20 is seen in FIG. 4 because the view is taken from the output end of the apparatus and the input end of the belt 20 remains aligned with the input ends of belts 10 and 30.

As a result of displacement, of the output end 24 of the belt 20 in the z-axis direction, the web 40 within Zones II-IV is elevated relative to the portions of the web 40 in Zones I and V (on belts 10 and 30). With that displacement, the distance between the edges of belts 10 and 20 is increased (along with the distance between the edges of belts 20 and 30) and the portions of the web 40 within Zones II and IV are stretched as the belt 20 is displaced in the z-axis direction. In a non-contact stretching method and apparatus such as that shown, the web within Zone II spans the difference in z-direction height between belts 10 and 20 in Zones I and III. Similarly, the web within Zone IV spans the difference in z-direction height between belts 20 and 30 in Zones III and V.

The amount of stretch induced in the web 40 is gradually increased as a point on the web 40 moves from the input end of the apparatus to the out put end because of the gradual slope of the belt 20 relative to belts 10 and 30 when the output end 24 is displaced as seen in FIGS. 2 and 4. Where the belts travel straight paths between the input end and the output end as seen in FIG. 2, the variation in stretch from input end to output end may be described as linear.

FIG. 2 also illustrates the stretch distance, i.e., the distance over which the selected zones of the web are stretched. Typically, stretch distance is defined by the distance between the input ends 12, 22, and 32 and the output ends 14, 24, and 34 of the belts 10, 20, and 30.

That stretch distance may, in some instances, preferably be equal to or greater than the width of the stretched zones of the web. In the illustrated methods and apparatus, therefore, the stretch distance may preferably be equal to or greater than the width of Zones II and IV. It may, alternatively, be preferred that the stretch distance be equal to or greater than the width of the web as a whole. In another manner of characterizing the stretch distance, it may be preferred that the stretch distance be twice as great or more as the width of at least one of the stretched zones in the web. For example, in the depicted embodiment, it may be preferred that the stretch distance be two or more times as large as the width of Zone II. In some instances, the relationship between the stretch distance and the width of at least one of the stretched zones be such that the stretch distance is four times or more the width of the relevant stretched zone. For example, in the depicted embodiment, it may be preferred that the stretch distance be four or more times as large as the width of Zone II.

In the apparatus depicted in FIG. 4, it may be preferred that the belts 10, 20, and 30 include some structure or material on their surfaces that acts to retain the web 40 in contact with the belt surfaces. For example, the belt surfaces may include mechanical structures such as one portion of a hook and loop structure that retains a complementary web 40 thereon during processing. Alternatively, the belts 10, 20, and 30 may retain the web 40 by other techniques including, but not limited to, adhesives, magnetic forces, etc. In other instances, materials that increase the coefficient of friction between the web 40 and belts 10, 20, and 30 may be used, e.g., abrasives, rubbers, etc. Still other alternatives may involve providing a structure, such as protruding pins, posts, pyramids, etc. on the belts 10, 20, and 30 to improve their ability to retain a web thereon.

Figure 5:
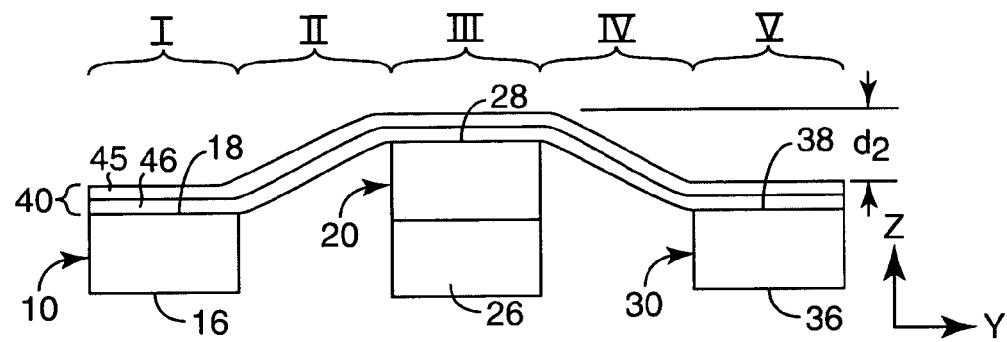
FIG. 5 is a view of the apparatus of FIG. 1 depicting further displacement of the belt 20 in the z-axis direction.

FIG. 5 is an end view of the apparatus of FIGS. 3 and 4 with, however, further displacement of the belt 20 in the z-axis direction over the distance $d_z$. Because the view seen in FIG. 5 is of the output and of the apparatus, the lower surface 26 of the belts 20 is also seen in FIG. 5. The increased displacement of belt 20 relative to adjacent belts 10 and 30 in the z-axis direction results in increased stretch of the web 40 within Zones II and IV (as compared to the amount of stretch provided in FIG. 4).

The change in displacement of belt 20 relative to adjacent belts 10 and 30 between FIGS. 3-5 also illustrates the adjustable nature of the process according to the present invention. For example, the apparatus can be easily threaded with a web while the belts 10, 20, and 30 are in their neutral positions as seen in FIG. 3 (in which the belts are aligned) and the displacement can be gradually increased as the web 40 moves in the down-web direction. Furthermore, the displacement of the belt 20 relative to one or both of belts 10 and 30 can be adjusted while the web 40 is moving in the down-web direction to adjust the amount of stretch induced in the zone or zones of the web 40.

Figure 6:
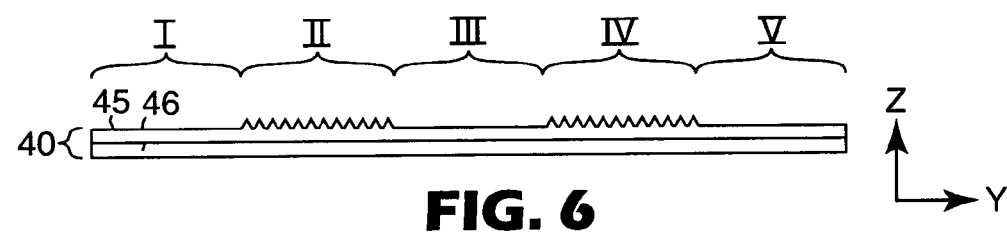
FIG. 6 is an enlarged cross-sectional view of the web of FIGS. 3–5 after stretching and relaxation.

FIG. 6 is an enlarged cross-sectional view of the web 40 after the forces associated with stretching as depicted in FIGS. 4 & 5 have been removed, thus allowing the stretched zones to relax. The web 40 includes layers 45 and 46 and can be defined by Zones I-V as discussed above. In Zones II and IV, i.e., the zones in which the web 40 was stretched as depicted in FIGS. 4 & 5, the web 40 may exhibit some gathering or wrinkling as depicted in FIG. 6 if the stretched zones are now elastic.

In connection with FIG. 6, it may be possible to characterize a web according to the present invention that includes one or more stretched zones. Such a web 40 may have an indefinite length, i.e., a length much greater than its width and may be, e.g., collected on a roll or directed immediately into a converting process where the web 40 can be slit, sheeted, etc. for incorporation into another product. The webs manufactured according to the present invention may be characterized in terms of their stretched zone or zones. For example, a web according to the present invention may include one or more stretched zones, with at least one of the stretched zones having a width in the cross-web direction of 5 millimeters or more when in a relaxed state (after removing the stretching forces), in some instances 10 millimeters or more.

All of the web within the stretching zones is stretched. That feature distinguishes a stretched zone in a web of the present invention from a ring-rolled web in which the portions of the web in contact with the intermeshing teeth are not typically stretched during processing, thus leaving small areas within a larger stretched zone unstretched.

Furthermore, as also described herein, the zones in which no stretching is performed may be as wide or wider than the stretching zones. Also, two stretching zones may be provided on opposite sides of a zone in which no stretching is provided. See, for example, Zones II–IV of web 40. In such an embodiment, all of the zones, i.e., the two stretched zones and the intermediate zone, may have a width of 5 millimeters or more.

If the stretched zones in, e.g., a web such as web 40 described above exhibit elasticity after stretching, the zones may be referred to as "activated" zones within the principles of the present invention. In some instances, however, stretched zones in webs of the present invention may not exhibit elasticity after stretching. Such zones may, for example, be stretched to provide molecular orientation, thinning, etc.

Figure 7:
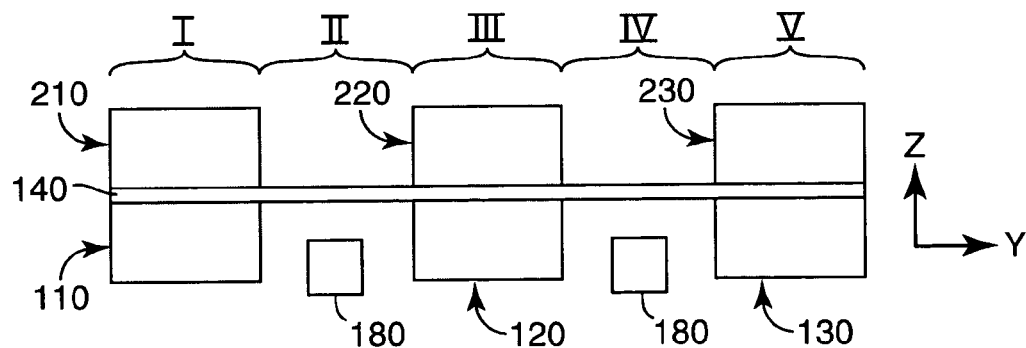
FIG. 7 is an end view of the output end of an alternate apparatus according to the present invention in which a web 140 is restrained between pairs of opposing belts within Zones I, III, and V.
Figure 8:
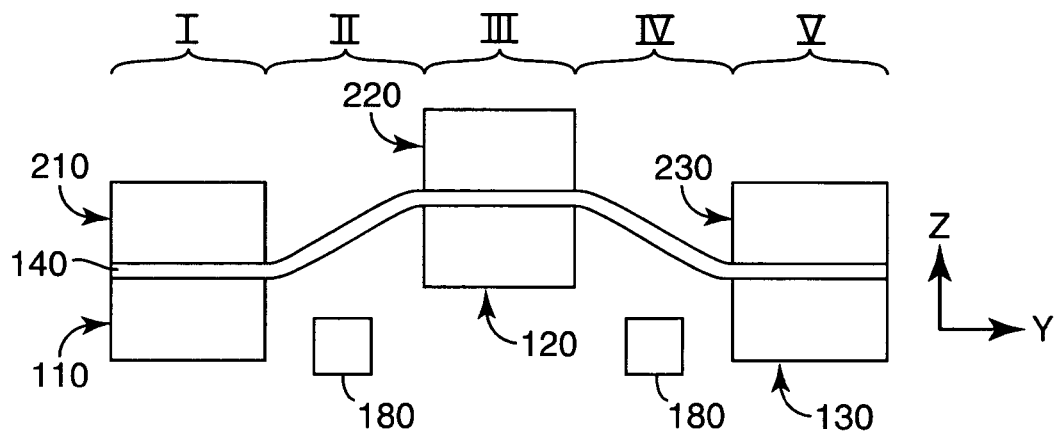
FIG. 8 is a view of the apparatus of FIG. 7 depicting z-axis direction displacement of the web 140 within Zone III.

FIGS. 7 & 8 depict an alternative apparatus according to the present invention. The apparatus depicted in FIGS. 7 & 8 is, in many respects, similar to the apparatus depicted in FIGS. 1–5. The apparatus also includes belts that define a series of zones occupying portions of the web path in the cross-web direction.

The apparatus of FIGS. 7 & 8 does, however, include pairs of opposing belts that clamp or otherwise restrain the web 140 within each of Zones I, III and V. For example, belts 110 and 210 in the Zone I clamp the portion of web 140 within Zone I to retain the web 140 between the two belts. Likewise, lower belt 120 retains the web 140 within Zone III in combination with upper belt 220. Similarly, lower belt 130 clamps the web 140 within Zone V in combination with upper belt 230. As with the apparatus of FIGS. 1–5, Zones II and IV of the web 140 are not restrained by belts or in contact with any belts.

FIG. 8 depicts the apparatus of FIG. 7 with Zone III of the web 140 displaced in the z-axis direction by lower belt 120 and upper belt 220. The web within Zones II and IV is stretched due to the retention of the web 140 within Zone I by lower belt 110 and upper belt 210. Similarly, on the opposite side of Zone III, belts 130 and 230 restrain the web within Zone V during stretching of the web 140 within Zones II and IV.

Although the portion of the web within each of Zones I, III, and V may be restrained solely by pressure between the pairs of opposing belts, one or both of the lower and upper belts in each of Zones I, III, and V may include a structure or material that assists in retaining the web 140 between the pairs of opposing belts.

Furthermore, the pressure between the pairs of opposing belts may be generated by a variety of techniques. For example, in some instances, the pressure caused by belt tension may be sufficient, with no intermediate support structures provided between the input ends and output ends of the belts. In other instances, it may be desirable to provide some intermediate support between the input and output ends of the belts to maintain sufficient pressure on the web clamped between the opposing belts during operation of the apparatus. Such intermediate supports may take the form of static structures (e.g., surfaces over which the belt rides) or dynamic structures (e.g., intermediate support rollers).

Also depicted in FIGS. 7 & 8 are thermal control units 180 that may be positioned to control the temperature of the web 140 within, e.g., Zones II and IV during processing. Thermal control units 180 may be used to heat and/or cool the web 140 during stretching as desired.

Figure 9:
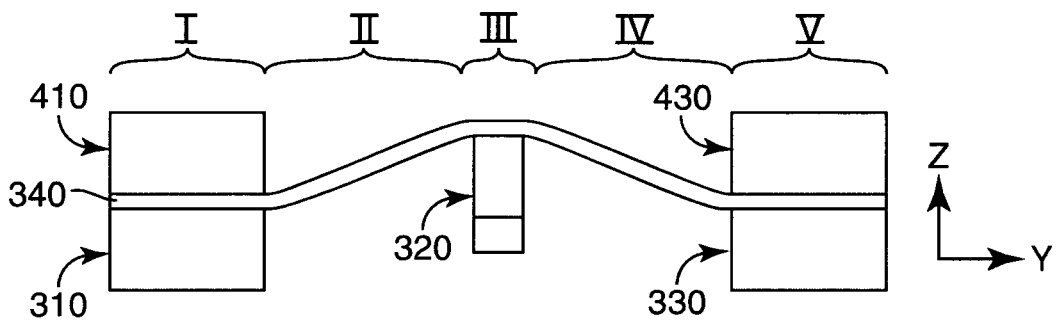
FIG. 9 is an elevational view of the output end of another alternative apparatus according to the present invention.

FIG. 9 depicts another alternative apparatus including a pair of opposing belts 310 and 410 in Zone I and a pair of opposing belts 330 and 430 in Zone V. Located between the pairs of opposing belts is a narrower belt 320 within Zone III that is used to displace the web 340 in the z-axis direction relative to the portions of the web 340 within Zones I and V. In the arrangement seen in FIG. 9, it may not be necessary to restrain the web 340 within Zone III while the portion of the web 340 within Zones II and IV is stretched due to displacement of the web 340 in Zone III.

One aspect depicted in FIG. 9 is that all of the belts and their corresponding zones in the web need not be uniform in size. The width of the zones in the cross-web direction can vary from zone to zone as needed. Another aspect depicted in FIG. 9 is that a narrower zone (e.g., Zone III in FIG. 9) may not require clamping to retain or restrain the web therein due to the higher forces that can be generated in a narrower web zone.

Figure 10:
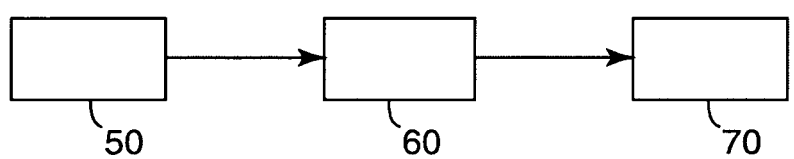
FIG. 10 is a block diagram of one system incorporating a web stretching apparatus according to the present invention.

FIG. 10 is a block diagram illustrating the concept that a web processing apparatus 60 used to stretch portions of a web can be used in-line with other web processing equipment. For example, the web processing apparatus 60 may be located downstream of an apparatus 50 that may, for example, process a pre-existing web by, e.g., heating, cooling, calendaring, applying materials to an existing web (e.g., applying hot melt or pressure sensitive adhesive to a web), etc. In some instances, the apparatus 50 may manufacture a web (by, e.g., extrusion, spin-bonding, carding, meltblowing, weaving, laminating a nonwoven or other inelastic web to an elastic web, etc.) that is then directed into a web processing apparatus according to the present invention.

The web processing apparatus 60 according to the present invention may itself be located upstream of another processing apparatus 70 that acts on the web after portions of the web have been stretched according to the principles of the present invention. For example, the apparatus 70 may be used to slit, perforate, and/or aperture the web at one or more locations, sheet the web, apply adhesives to the web, laminate materials to the web (e.g., attach mechanical fastener materials such as hooks), die cutting, etc.

The apparatus 70 may also be used to maintain the web in its stretched condition for a desired dwell time during which the web or portions of the web may be subjected to additional treatments. For example, it may be desirable to raise and/or lower the temperature of the web or portions of the web in a controlled manner. The dwell time may be held by, e.g., using belts or other structures that maintain a constant level of stretch as induced by the apparatus described above with respect to FIGS. 1–9.

Figure 11:
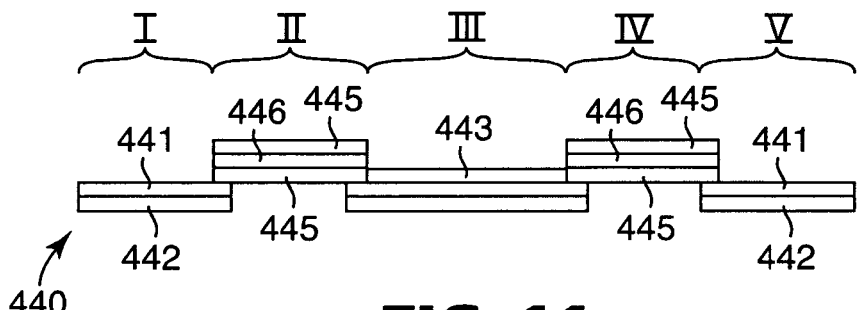
FIG. 11 is a cross-sectional view of one web that can be processed using the apparatus and/or methods of the present invention.

As briefly addressed above, the present invention can be used to process any suitable web, including homogenous, monolayer webs, multilayer webs, composite webs, etc. A suitable web is shown schematically as a unitary, multilayer web in, for example, FIG. 6. An example of a composite web that may be processed using the apparatus and methods of the present invention is depicted in FIG. 11. The web 440 of FIG. 11 is a composite web with various different components laminated together (with a cross-sectional view of the web depicted in FIG. 11).

Various zones are identified in connection with web 440 that correspond (for convenience) to the zones described in connection with the apparatus of FIGS. 1–8 above. In the web 440, Zones I and V each contain an adhesive layer 441 on a substrate 442. By restraining the web 440 within opposing belts as described in connection with the apparatus of FIGS. 7 & 8, the integrity of the adhesive layer 441 may be better maintained.

Zone III of the web 440 contains a layer 443 used in a mechanical fastener (e.g., a layer of hook material for a hook and loop fastener). Like the adhesive found in Zones I and V, it may be desirable to prevent any significant amount of stretch within Zone III of the web to maintain the integrity of the mechanical fastener material 443 located therein.

Zones II and IV of the web 440 contain a laminate including an inelastic cover layer 445 on each side of a layer 446 of elastic material (it being understood that an inelastic cover layer 445 may only be provided on one side of the layer 446 of elastic material 446). Until stretched to release their inelastic bonds, the cover layers 445 will typically restrain the elastic layer 446 in both the down-web and cross-web directions. When processed using the apparatus and/or methods of the present invention, however, the inelastic bonds within the cover layers 445 are separated, thereby making the web within Zones II and IV elastic in the cross-web direction due to the elasticity of the layer 446.

After processing according to the principles of the present invention, the web 440 can be directed into a slitter or other separation device such that the web 440 is separated within Zone III, resulting in two webs, each including an adhesive component (Zone I or V), an elastic component (Zone II or IV), and a mechanical fastener component (a portion of Zone III). These webs can then be sheeted and used in a variety of products including, but not limited to, childrens' diapers, adult incontinence devices, bedding (e.g. sheets, pillow cases, etc.), apparel, etc.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

The invention claimed is:

1. A method of stretching a web, the method comprising:
advancing a web in a down-web direction, the web comprising a width in a cross-web direction transverse to the down-web direction, wherein the web further comprises first, second, and third zones, each of the first, second, and third zones comprising a portion of the width of the web and extending along a length of the web in the down-web direction, wherein the second zone is located between the first and third zones; and
stretching the web within the second zone in the cross-web direction over a stretch distance while advancing the web in the down-web direction, wherein the stretching comprises changing positions of the first zone and the third zone relative to each other in a stretch direction perpendicular to both the down-web and the cross-web directions;
wherein all of the web within the second zone is stretched, and wherein the second zone has a width of 5 millimeters or more before the stretching.

2. A method according to claim 1, wherein the stretching activates the second zone such that the second zone exhibits elasticity after stretching.

3. A method according to claim 1, wherein the first zone has a width that is equal to or greater than the width of the second zone before stretching.

4. A method according to claim 1, wherein the first zone has a width that is equal to or greater than the width of the second zone before stretching, and wherein the third zone has a width that is equal to or greater than the width of the second zone before stretching.

5. A method according to claim 1, wherein stretching the web within the second zone by 100% induces a strain rate of 100 per minute or less while advancing the web in the down-web direction at a line speed of 20 meters per minute, wherein the strain rate increases at a rate linearly proportional to the line speed.

6. A method according to claim 5, wherein the stretch distance is 0.2 meters or more.

7. A method according to claim 1, wherein stretching the web within the second zone by 100% induces a strain rate of 50 per minute or less when advancing the web in the down-web direction at a line speed of 20 meters per minute with the strain rate increasing at a rate linearly proportional to the line speed.

8. A method according to claim 7, wherein the stretch distance is 0.4 meters or more.

9. A method according to claim 1, wherein changing the position of the first zone relative to the third zone comprises linearly increasing a difference in the position of the first zone relative to the third zone in the stretch direction over the stretch distance.

10. A method according to claim 1, further comprising:
clamping the web within the first zone between opposing belts while stretching the web within the second zone over the stretch distance; and
clamping the web within the third zone between opposing belts while stretching the web within the second zone over the stretch distance.

11. A method according to claim 10, wherein, over the stretch distance, the web within the second zone spans between the opposing belts clamping the web within the first zone and the web within the third zone.

12. A method according to claim 1, wherein, over the stretch distance, web path lengths of the web within the first, the second, and the third zones are all equal.

13. A method according to claim 1, wherein, over the stretch distance, a web path length of the web within the first zone is different than a web path length of the web within the second zone, and wherein down-web velocity of the web within the first zone is different than down-web velocity of the web within the second zone.

14. A method of stretching a web, the method comprising:
advancing a web in a down-web direction, the web comprising a width in a cross-web direction transverse to the down-web direction, wherein the web further comprises first, second, and third zones, each of the first, second, and third zones comprising a portion of the width of the web and extending along a length of the web in the down-web direction, wherein the second zone is located between the first and third zones;
stretching the web within the second zone in the cross-web direction over a stretch distance while advancing the web in the down-web direction, wherein the stretching comprises changing positions of the first zone and the third zone relative to each other in a stretch direction perpendicular to both the down-web and the cross-web directions, and wherein stretching the web within the second zone by 100% induces a strain rate of 100 per minute or less while advancing the web in the down-web direction at a line speed of 20 meters per minute, wherein the strain rate increases at a rate linearly proportional to the line speed.

15. A method according to claim 14, wherein the stretching activates the second zone such that the second zone exhibits elasticity after stretching.

16. A method according to claim 14, wherein the stretch distance is 0.2 meters or more.

17. A method according to claim 14, wherein stretching the web within the second zone by 100% induces a strain rate of 50 per minute or less while advancing the web in the down-web direction at a line speed of 20 meters per minute, wherein the strain rate increases at a rate linearly proportional to the line speed.

18. A method according to claim 17, wherein the stretch distance is 0.4 meters or more.

19. A method according to claim 14, wherein all of the web within the second zone is stretched, and wherein the first zone has a width that is equal to or greater than a width of the second zone before stretching.

20. A method according to claim 14, wherein all of the web within the second zone is stretched, wherein the first zone has a width that is equal to or greater than a width of the second zone before stretching, and wherein the third zone has a width that is equal to or greater than a width of the second zone before stretching.

21. A method according to claim 14, wherein changing the position of the first zone relative to the third zone comprises linearly increasing a difference in the position of the first zone relative to the third zone in the stretch direction over the stretch distance.

22. A method according to claim 14, wherein, over the stretch distance, the web within the second zone spans between opposing belts clamping the web within the first zone and the web within the third zone.

23. A method according to claim 14, further comprising:
clamping the web within the first zone between opposing belts while stretching the web within the second zone over the stretch distance; and
clamping the web within the third zone between opposing belts while stretching the web within the second zone over the stretch distance.

24. A method according to claim 14, wherein, over the stretch distance, web path lengths of the web within the first, the second, and the third zones are all equal.

25. A method according to claim 14, wherein, over the stretch distance, a web path length of the web within the first zone is different than a web path length of the web within the second zone, and wherein down-web velocity of the web within the first zone is different than down-web velocity of the web within the second zone.

26. A method of stretching a web, the method comprising:
advancing a web in a down-web direction, the web comprising a width in a cross-web direction transverse to the down-web direction, wherein the web further comprises first, second, and third zones, each of the first, second, and third zones comprising a portion of the width of the web and extending along a length of the web in the down-web direction, wherein the second zone is located between the first and third zones; and
stretching the web within the second zone in the cross-web direction over a stretch distance while advancing the web in the down-web direction, wherein the stretching comprises changing positions of the first zone and the third zone relative to each other in a stretch direction perpendicular to both the down-web and the cross-web directions;
wherein changing the position of the first zone relative to the third zone comprises linearly increasing a difference in the position of the first zone relative to the third zone in the stretch direction over the stretch distance.

27. A method according to claim 26, wherein the stretching activates the second zone such that the second zone exhibits elasticity after stretching.

28. A method according to claim 26, wherein the first zone has a width that is equal to or greater than a width of the second zone before stretching.

29. A method according to claim 26, wherein the first zone has a width that is equal to or greater than a width of the second zone before stretching, and wherein the third zone has a width that is equal to or greater than a width of the second zone before stretching.

30. A method according to claim 26, wherein stretching the web within the second zone by 100% induces a strain rate of 100 per minute or less while advancing the web in the down-web direction at a line speed of 20 meters per minute, wherein the strain rate increases at a rate linearly proportional to the line speed.

31. A method according to claim 30, wherein the stretch distance is 0.2 meters or more.

32. A method according to claim 26, further comprising:
clamping the web within the first zone between opposing belts while stretching the web within the second zone over the stretch distance; and
clamping the web within the third zone between opposing belts while stretching the web within the second zone over the stretch distance.

33. A method according to claim 32, wherein, over the stretch distance, the web within the second zone spans between the opposing belts clamping the web within the first zone and the web within the third zone.

34. A method according to claim 26, wherein, over the stretch distance, web path lengths of the web within the first, the second, and the third zones are all equal.

35. A method according to claim 26, wherein, over the stretch distance, a web path length of the web within the first zone is different than a web path length of the web within the second zone, and wherein down-web velocity of the web within the first zone is different than down-web velocity of the web within the second zone.

36. A method of stretching a web, the method comprising:
advancing a web in a down-web direction, the web comprising a width in a cross-web direction transverse to the down-web direction, wherein the web further comprises first, second, and third zones, each of the first, second, and third zones comprising a portion of the width of the web and extending along a length of the web in the down-web direction, wherein the second zone is located between the first and third zones; and
stretching the web within the second zone in the cross-web direction over a stretch distance while advancing the web in the down-web direction, wherein stretching the web within the second zone by 100% induces a strain rate of 100 per minute or less while advancing the web in the down-web direction at a line speed of 20 meters per minute, wherein the strain rate increases at a rate linearly proportional to the line speed.

37. A method according to claim 36, wherein the stretch distance is 0.2 meters or more.

38. A method according to claim 36, wherein stretching the web within the second zone by 100% induces a strain rate of 50 per minute or less when advancing the web in the down-web direction at a line speed of 20 meters per minute with the strain rate increasing at a rate linearly proportional to the line speed.

39. A method according to claim 38, wherein the stretch distance is 0.4 meters or more.

* * * * *